Oct. 29, 1957  P. GRAMATZKI  2,811,370
DEVICE FOR MOUNTING A VEHICLE FRAME
ON THE AXLES OF A VEHICLE
Filed Feb. 16, 1956
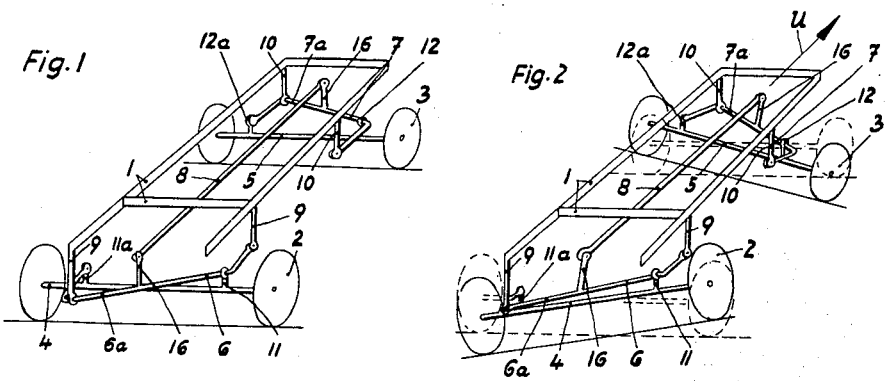
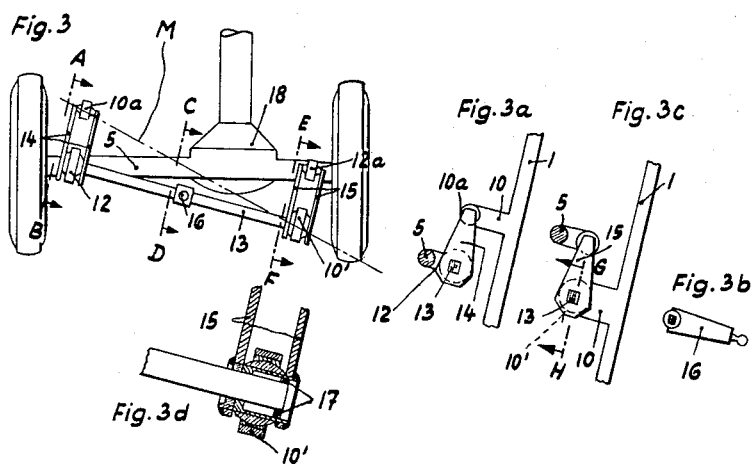
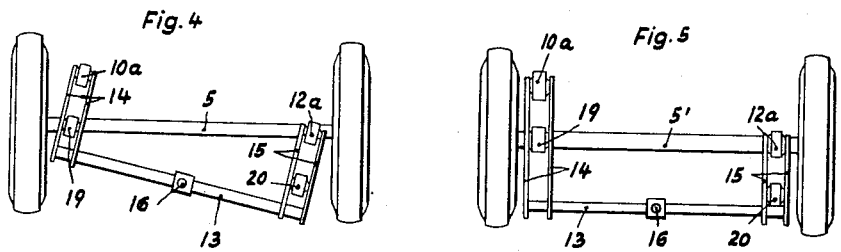
INVENTOR.
Paul Gramatzki
BY
Michael S. Striker United States Patent Office 2,811,370
Patented Oct. 29, 1957

2,811,370

DEVICE FOR MOUNTING A VEHICLE FRAME ON THE AXLES OF A VEHICLE

Paul Gramatzki, Hamburg-Othmarschen, Germany

Application February 16, 1956, Serial No. 566,002

Claims priority, application Germany February 16, 1955

9 Claims. (Cl. 280—112)

The present invention relates to vehicles and more particularly to spring mountings interconnecting the frame of a vehicle with the axles thereof.

Vehicles have been provided with arrangements for compensating for the pressure of the wheels of the vehicle on the surface they engage in such a way that the movement of one wheel forces certain movements of the other wheels. Thus, on one side of the vehicle the wheels are compelled to move in opposite directions. For example, if on a given side of the vehicle one wheel moves upwardly then the other wheel on the same side is compelled to move downwardly to provide the above mentioned compensation of the wheel pressures on the surface they engage.

Vehicles have already been provided with means for providing this compensation, and this known means takes the form of torsion springs extending across the vehicle. These known arrangements cannot be used, however, with vehicles having drive axles, because the available space over the differential housing is too small to accommodate such a torsion spring.

One of the objects of the present invention is to provide a spring mounting for a vehicle which will yieldably resist movement of the wheels and axles toward and away from the vehicle frame.

Another object of the present invention is to provide a torsion spring mounting arrangement which will not only yieldably resist movement of the wheels and axles toward and away from the frame, but which will also compel one of the wheel axles to tilt laterally in one direction when the other of the wheel axles tilts laterally in the opposite direction.

A further object of the present invention is to provide a torsion spring mounting arrangement which can be used with vehicles having drive axles provided with differentials.

According to the invention, the vehicle is provided with a pair of torsion springs respectively located adjacent the front and rear axles, and each torsion spring has connected thereto a pair of levers extending in the same direction therefrom. The levers on one side of the vehicle are connected by suitable bearings at their free ends to the vehicle frame, while the levers on the opposite side of the vehicle are connected by suitable bearings adjacent the springs to the vehicle frame. The axles are capable of turning freely, respectively, about an axis passing through the bearings connected to the frame and the axles are at the same time yieldably mounted for resilient movement with respect to the vehicle frame when moving toward and away from the same. The springs are interconnected in such a way that the lateral tilting movement of one axle in one direction produces a lateral tilting movement of the other axle in the opposite direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic perspective view of a vehicle frame and the vehicle wheels and axles shown assembled with the torsion spring mounting of the invention, the vehicle being shown in Fig. 1 when it stands on a flat horizontal surface;

Fig. 2 shows the structure of Fig. 1 as it passes over an irregular surface;

Fig. 3 is a fragmentary plan view of a vehicle axle and a torsion mounting according to the present invention;

Figs. 3a–3c are respectively sectional views taken along lines A—B, C—D, and E—F of Fig. 3 in the direction of the arrows;

Fig. 3d is a fragmentary sectional view taken along line G—H of Fig. 3b in the direction of the arrows; and Figs. 4 and 5 are respectively plan views similar to Fig. 3 of different embodiments of spring mounts according to the present invention.

In Figs. 1 and 2, the vehicle frame 1 is shown together with the front wheels 2, the rear wheels 3, the front axle 4, and the rear axle 5. Bearings 9 and 10 are connected to the vehicle frame 1, and it will be seen that the bearings 9 and 10 on the right side of the vehicle frame, as viewed in Fig. 1, are located nearer to each other than the bearings 9 and 10 on the left side of the vehicle frame. Also, bearings 11 and 11a are connected to the front axle 4, while the bearings 12 and 12a are connected to the rear axle 5.

In Figs. 1 and 2 the torsion spring assemblies of the invention are shown as substantially U-shaped members 6 and 7, these assemblies each including an elongated torsion spring and a pair of levers fixed to and extending in the same direction from the ends thereof, as will be apparent from the description which follows. Thus, it will be seen that the torsion spring 6 has at its free ends a pair of levers extending therefrom and respectively connected at their free ends to the bearings 11a and 9, the latter bearing 9 being located on the right side of the vehicle frame 1, as viewed in Fig. 1, while the torsion spring assembly 7 includes an elongated torsion spring having a pair of levers fixed to and extending from its free ends, the free end of the left lever connected to spring 7, as viewed in Fig. 1, being connected to the bearing 12a, while the free end of the other lever connected to the spring 7 is connected to the bearing 10 at the right side of the vehicle frame, as viewed in Fig. 1. It will also be seen that an elongated connecting rod 8 interconnects the torsion springs by being connected to the free ends of elements 16 which are respectively fixed to and which extend upwardly from the torsion springs 6 and 7.

A comparison of Figs. 1 and 2 illustrates the manner in which wheel pressure compensation is brought about according to the invention. If, for example, the connecting rod 8 is longitudinally shifted in the direction of arrow U of Fig. 2, it will be seen that each spring assembly turns in the bearings 9 and 10. Thus, the axle bearings 11 and 12a are raised, and the axle bearings 11a and 12 are lowered. The axles which are fixed to these bearings thus are compelled to carry out lateral tilting movements in opposite directions with respect to the vehicle frame. Actually the movement does not come from the connecting rod 8 in the original instance, but from the wheels 2 and 3 when they pass over an irregular surface, as illustrated in Fig. 2. If the frame of Fig. 1 moves up and down with respect to the axles while remaining parallel thereto, then the sections 6a of the torsion spring 6 on opposite sides of element 16 as well as the sections 7a of torsion spring 7 on opposite sides of element 16 connected thereto are subjected to turning moments of the same force but opposite directions, so that in this way the movement of the vehicle frame toward and away from the axles and movement of the axles toward and away from the vehicle frame is resiliently resisted by the illustrated torsion spring arrangement.

Tilting movement of the axles and spring resistance to the movement of the frame and axles with respect to each other can take place independently of each other or simultaneously.

Fig. 3 illustrates an example of a practical embodiment of the invention where the torsion spring 13 is composed of a plurality of elongated leaf springs which are interconnected into a bundle. The torsion spring 13 has fixed thereto a pair of elongated levers 14 and 15 which extend in the same direction from the torsion spring, and furthermore the element 16 is shown fixed to and extending upwardly from the torsion spring 13, as shown in Fig. 3b. A pair of bearings 12 and 10' surround the torsion spring 13 adjacent its free ends, and a pair of bearings 10a and 12a are connected to the free ends of the levers 14 and 15, respectively. Each pair of bearings connected to one of the levers 14 and 15 are respectively connected to the frame 1 and the axle 5, as is evident from Figs. 3a-3d as well as from Fig. 3. The bearings are capable of performing swinging and angular movements. The angular movement of the bearings 10' and 12 which surround the torsion spring must be limited, however, so that the assembly will be stable with respect to centrifugal forces which act on the vehicle as when the latter travels along a turn, for example. Fig. 3d shows a stop member 17 which serves this purpose.

The operation of the described arrangement can best be understood by considering the structure of the invention kinematically.

When undergoing a pure springing action, as when the axles and frame only move toward and away from each other, each spring turns angularly with respect to the frame because each spring is connected at one end to the axle and at the other end to the frame, and simultaneously the levers swing about the axis of the spring. The angular and swinging movements thus take place simultaneously. The levers, however, are maintained in a position where they extend normally from the spring by a suitable means such as the stops 17. Thus, the entire assembly is maintained stable with respect to horizontal forces acting perpendicularly to the longitudinal axis of the vehicle, such as centrifugal forces of the type mentioned above, although the bearings are freely movable in space.

When undergoing a pure springing action, the distance between the centers of the bearings 12 and 10' adjacent the ends of the spring 13 theoretically becomes smaller. The difference is, however, very small and corresponds approximately to the shortening of the spring during turning thereof, so that the error vanishes. Therefore, axial movement of the bearings is superfluous.

When the axles move angularly with respect to the frame, there is also a simultaneous rotary and swinging movement in the bearings. Also the spring carries out an angular movement with respect to the frame. However, the lateral tilting movement of the springs with respect to the frame is only half as great as that of the axles.

A theoretical change of the distance between the bearings does not take place. As can be seen from Fig. 3, the entire assembly of torsion spring, levers, an axle, can theoretically turn through 360° about the center line M which extends through the bearings 10a and 10' without axial play.

As may be seen from Fig. 3, the wheel compensating arrangement of the invention provides sufficient space for the differential housing 18 of the axle. Furthermore, Fig. 3 clearly illustrates the extreme simplicity of the assembly which includes only four spring connections.

Fig. 4 shows a similar arrangement where, however, the spring 13 is not centrally arranged in a pair of bearings 12 and 10', but instead is located adjacent bearings 19 and 20 which are connected to the levers 14 and 15, respectively, this arrangement is of advantage when the space required by the differential housing is very large.

Fig. 5 shows an arrangement where the spring 13 is located at an even greater distance from the axle 5'. With this embodiment the distance from the center of the bearing 19 on one side of the vehicle to the spring 13 is different from the distance from the center of the bearing 20 at the opposite side of the vehicle to the spring 13.

The above described arrangements are only by way of example and can be varied.

The torsion elements can be provided with shearing or compression springs and bendable or leaf springs.

The construction of the invention can also be used with swinging, parallel, or cranked axles.

It will be understood that each of the elements described above, or two or more together, may also find a useful application in other types of spring mountings differing from the types described above.

While the invention has been illustrated and described as embodied in spring mountings for vehicles, it is not intended to be limited to the details shown, since various modifications and structural changes may be made without departing in any way from the spirit of the present invention.

Without further analysis, the foregoing will so fully reveal the gist of the present invention that others can by applying current kowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; and a pair of bearing means connected to each lever, one of said bearing means being connected to the free end of each lever and the other of said bearing means being connected to each lever adjacent the spring connected thereto, the pair of bearing means connected respectively to the free ends of the levers on one side of the vehicle frame being connected respectively to said axles and forming a pair of axle bearing means and the other pair of bearing means respectively connected to said levers on said one side of said vehicle frame being connected to said vehicle frame and forming a pair of frame bearing means, and the pair of bearing means connected to the free ends of said levers, respectively, on the other side of said frame being connected to the latter and forming a pair of frame bearing means and the other pair of bearing means respectively connected to said levers on said other side of said frame being respectively connected to said axles and forming a pair of axle bearing means, the two frame bearing means and the spring and levers connected thereto adjacent each axle supporting said axle and the spring and levers connected thereto for free, unresisted turning movement about an axis passing through said two frame bearing means, and the two axle bearing means adjacent each axle supporting the levers adjacent thereto for simultaneous turning in opposite directions to twist the spring fixed to the latter levers for resisting movement of said axle toward and away from said frame;

and linkage means interconnecting said torsion springs for producing a lateral tilting movement of one of said axles in one direction when the other of said axles tilts laterally in the opposite direction.

2. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; a pair of bearing means connected to each lever, one of said bearing means being connected to the free end of each lever and the other of said bearing means being connected to each lever adjacent the spring connected thereto, the pair of bearing means connected respectively to the free ends of the levers on one side of the vehicle frame forming a pair of axle bearing means connected respectively to said axles and the other pair of bearing means respectively connected to said levers on said one side of said vehicle frame forming a pair of frame bearing means connected to said vehicle frame, and the pair of bearing means connected to the free ends of said levers, respectively, on the other side of said frame forming a pair of frame bearing means connected to the frame and the other pair of bearing means respectively connected to said levers on said other side of said frame forming a pair of axle bearing means respectively connected to said axles, the two frame bearing means adjacent each axle supporting said axle and the spring and levers connected thereto for free, unresisted turning movement about an axis passing through said two frame bearing means, and the two axle bearing means adjacent each axle supporting the levers adjacent thereto for simultaneous turning in opposite directions to twist the spring fixed to the latter levers for resisting movement of said axle toward and away from said frame, said bearing means connected to said levers adjacent said springs being capable of carrying out swinging and angular movements; and linkage means interconnecting said torsion springs for producing a lateral tilting movement of one of said axles in one direction when the other of said axles tilts laterally in the opposite direction.

3. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; a pair of bearing means connected to each lever, one of said bearing means being connected to the free end of each lever and the other of said bearing means being connected to each lever adjacent the spring connected thereto, the pair of bearing means connected respectively to the free ends of the levers on one side of the vehicle frame forming a pair of axle bearing means connected respectively on said axles and the other pair of bearing means respectively connected to said levers on said one side of said vehicle frame forming a pair of frame bearing means connected to said vehicle frame, and the pair of bearing means connected to the free ends of said levers, respectively, on the other side of said frame forming a pair of frame bearing means connected to the frame and the other pair of bearing means respectively connected to said levers on said other side of said frame forming a pair of axle bearing means respectively connected to said axles, the two frame bearing means adjacent each axle supporting said axle and the levers and spring connected thereto for free, unresisted turning movement about an axis passing through said two frame bearing means, and the axle bearing means adjacent each axle supporting the levers adjacent thereto for simultaneous turning in opposite directions to twist the spring fixed to the latter levers for resisting movement of said axle toward and away from said frame, said bearing means connected to said levers adjacent said springs being capable of carrying out swinging and angular movements; linkage means interconnecting said torsion springs for producing a lateral tilting movement of one of said axles in one direction when the other of said axles tilts laterally in the opposite direction; and stop means operatively engaging the pair of bearings respectively connected to each pair of levers adjacent the spring connected thereto for limiting the angular movement of said pair of bearings so as to provide said levers with stability against centrifugal forces.

4. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; a pair of bearing means connected to each lever, one of said bearing means being connected to the free end of each lever and the other of said bearing means being connected to each lever adjacent the spring connected thereto, the pair of bearing means connected respectively to the free ends of the levers on one side of the vehicle frame being connected respectively to said axles and the other pair of bearing means respectively connected to said levers on said one side of said vehicle frame being connected to said vehicle frame, and the pair of bearing means connected to the free ends of said levers, respectively, on the other side of said frame being connected to the latter and the other pair of bearing means respectively connected to said levers on said other side of said frame being respectively connected to said axles, the pair of bearing means adjacent each axle connected to said frame supporting said axle and the levers and spring connected thereto for free, unresisted turning movement about an axis passing through said pair of bearing means connected to said frame, and the bearing means adjacent each axle connected to the same supporting the levers adjacent thereto for simultaneous turning in opposite directions to twist the spring fixed to the latter levers for resisting movement of said axle toward and away from said frame, said bearing means connected to said levers adjacent said springs being capable of carrying out swinging and angular movements, each spring having end portions respectively arranged centrally within the bearings connected to the levers adjacent said spring so that each spring is swingable on one side of the vehicle in the bearing connected to said frame and on the other side of the vehicle in the bearing connected to the axle adjacent said spring; and linkage means interconnecting said torsion springs for producing a lateral tilting movement of one of said axles in one direction when the other of said axles tilts laterally in the opposite direction.

5. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; a pair of bearing means connected to each lever, one of said bearing means being connected to the free end of each lever and the other of said bearing means being connected to each lever adjacent the spring connected thereto, the pair of bearing means connected respectively to the free ends of the levers on one side of the vehicle frame being connected respectively to said axles and the other pair of bearing means respectively connected to said levers on said one side of said vehicle frame being connected to said vehicle frame, and the pair of bearing means connected to the free ends of said levers, respectively, on the other side of said frame being connected to the latter and the other pair of bearing means respectively connected to said levers on said other side of said frame being respectively connected to said axles, the pair of bearing means adjacent each axle connected to said frame supporting said axle and the levers and spring connected thereto for free, unresisted turning movement about an axis passing through said pair of bearing means connected to said frame, and the bearing means adjacent each axle connected to the same supporting the levers adjacent thereto for simultaneous turning in opposite directions to twist the spring fixed to the latter levers for resisting movement of said axle toward and away from said frame, said bearing means connected to said levers adjacent said springs being capable of carrying out swinging and angular movements each spring having end portions respectively arranged centrally within the bearings connected to the levers adjacent said spring so that each spring is swingable on one side of the vehicle in the bearing connected to said frame and on the other side of the vehicle in the bearing connected to the axle adjacent said spring, said bearing means connected to each spring mounting the latter for swinging movement about a turning point at an end portion of said spring when the latter resiliently resists movement of the axle adjacent the same with respect to said frame; and linkage means interconnecting said torsion springs for producing a lateral tilting movement of one of said axles in one direction when the other of said axles tilts laterally in the opposite direction.

6. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; a pair of bearing means connected to each lever, one of said bearing means being connected to the free end of each lever and the other of said bearing means being connected to each lever adjacent the spring connected thereto, the pair of bearing means connected respectively to the free ends of the levers on one side of the vehicle frame being connected respectively to said axles and the other pair of bearing means respectively connected to said levers on said one side of said vehicle frame being connected to said vehicle frame, and the pair of bearing means connected to the free ends of said levers, respectively, on the other side of the frame being connected to the latter and the other pair of bearing means respectively connecetd to said levers on said other side of said frame being respectively connected to said axles, the pair of bearing means adjacent each axle connected to said frame supporting said axle and the levers and spring connected thereto for free, unresisted turning movement about an axis passing through said pair of bearing means connected to said frame, and the bearing means adjacent each axle connected to the same supporting the levers adjacent thereto for simultaneous turning in opposite directions to twist the spring fixed to the latter levers for resisting movement of said axle toward and away from said frame, said bearings adjacent each spring being spaced therefrom; and linkage means interconnecting said torsion springs for producing a lateral tilting movement of one of said axles in one direction when the other of said axles tilts laterally in the opposite direction.

7. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; a pair of bearing means connected to each lever, one of said bearing means being connected to the free end of each lever and the other of said bearing means being connected to each lever adjacent the spring connected thereto, the pair of bearing means connected respectively to the free ends of the levers on one side of the vehicle frame being connected respectively to said axles and the other pair of bearing means respectively connected to said levers on said one side of said vehicle frame being connected to said vehicle frame, and the pair of bearing means connected to the free ends of said levers, respectively, on the other side of said frame being connected to the latter and the other pair of bearing means respectively connected to said levers on said other side of said frame being respectively connected to said axles, the pair of bearing means adjacent each axle connected to said frame supporting said axle and the levers and spring connected thereto for free, unresisted turning movement about an axis passing through said pair of bearing means connected to said frame and the bearing means adjacent each axle connectd to the same supporting the levers adjacent thereto for simultaneous turning in opposite directions to twist the spring fixed to the latter levers for resisting movement of said axle toward and away from said frame which is resisted by said spring, the pair of bearings adjacent each spring being located at different distances therefrom; and linkage means interconnecting said torsion springs for producing a lateral tilting movement of one of said axles in one direction when the other of said axles tilts laterally in the opposite direction.

8. A spring mounting for vehicles comprising, in combination, a vehicle frame; front and rear axles respectively located beneath and spaced from said frame and adapted to be connected to the wheels of the vehicle; an elongated torsion spring located adjacent each axle and extending angularly with respect thereto; a pair of levers fixed to each torsion spring adjacent the ends thereof, respectively, and extending in the same direction therefrom so that said pair of levers are substantially parallel to each other; a pair of bearing means connected to each lever, one of said bearings means being connected to the free end of each lever and the other of said bearing means being connected to each lever adjacent the spring connected thereto, the pair of bearing means connected respectively to the free ends of the levers on one side of the vehicle frame being connected respectively to said axles and the other pair of bearing means respectively connected to said levers on said one side of said vehicle frame being connected to said vehicle frame, and the pair of bearing means connected to the free ends of said levers, respectively, on the other side of said frame being connected to the latter and the other pair of bearing means respectively connected to said levers on said other side of said frame being respectively connected to said axles, the pair of bearing means adjacent each axle connected to said frame supporting said axle and the levers and spring connected thereto for free, unrestricted turning movement about an axis passing through said pair of bearing means connected to said frame, and the bearing means adjacent each axle connected to the same supporting the levers adjacent thereto for simultaneous turning in opposite directions to twist the spring fixed to the latter levers for resisting movement of said axle toward and away from said frame; linkage means interconnecting said torsion springs for producing a lateral tilting movement of one of said axles in one direction when the other of said axles tilts laterally in the opposite direction; and means stabilizing said vehicle frame against lateral centrifugal forces.

9. A spring mounting for vehicles, comprising, in combination, a vehicle frame; front and rear axles respectively located beneath and spaced from said frame and adapted to be connected to the wheels of the vehicle; a pair of parallel levers located adjacent each axle and respectively adjacent opposite sides of said frame beneath the latter; an elongated torsion spring extending between and fixed to each pair of levers; a pair of axle bearing means connected to each axle and respectively connected to the pair of levers adjacent each axle; a pair of frame bearing means respectively connected to opposite sides of said frame and respectively connected to the pair of levers adjacent each axle, the two frame bearing means at one side of said frame being respectively located forwardly of said front axle and rearwardly of said rear axle and the two frame bearing means at the other side of said frame being respectively located rearwardly of the front axle and forwardly of the rear axle, the pair of frame bearing means adjacent each axle supporting the latter axle and the spring and levers conected thereto for free turning movement about an axis passing through the latter pair of frame bearing means, and each pair of axle bearing means supporting the levers respectively connected thereto for simultaneous turning movement in opposite directions to twist the spring extending between and connected to each pair of levers for resisting movement of said frame toward and away from each axle; and linkage means interconnecting said torsion springs for producing a lateral tilting movement of one of said axles in one direction when the other of said axles tilts laterally in the opposite direction.

References Cited in the file of this patent
UNITED STATES PATENTS

| | | |
|---|---|---|
| 1,767,987 | Johnston | June 24, 1930 |
| 2,739,923 | Kolbe | Mar. 27, 1956 |